United States Patent
Gupta et al.

(10) Patent No.: US 7,621,318 B2
(45) Date of Patent: Nov. 24, 2009

(54) HEAT PIPE STRUCTURE

(75) Inventors: Ramesh Gupta, Annandale, NJ (US); Yoshihiro Iwashita, Mishima (JP)

(73) Assignees: Exxonmobile Research and Engineering Co., Annandale, NJ (US); Toyota Jidosha Kabushiki Kaisha, Toyota (JP)

( * ) Notice: Subject to any disclaimer, the term of this patent is extended or adjusted under 35 U.S.C. 154(b) by 148 days.

(21) Appl. No.: 11/482,720

(22) Filed: Jul. 10, 2006

(65) Prior Publication Data

US 2008/0006394 A1    Jan. 10, 2008

(51) Int. Cl.
*F28D 15/00* (2006.01)
*F28F 13/00* (2006.01)
(52) U.S. Cl. ............ 165/104.21; 165/135; 165/136
(58) Field of Classification Search ............ 165/104.21, 165/104.22, 104.26, 47, 89, 135, 136, 272, 165/273, 274
See application file for complete search history.

(56) References Cited

U.S. PATENT DOCUMENTS

| | | | | |
|---|---|---|---|---|
| 3,831,664 A | * | 8/1974 | Pogson | 165/104.26 |
| 3,847,208 A | * | 11/1974 | Ollendorf | 165/47 |
| 3,957,107 A | * | 5/1976 | Altoz et al. | 165/104.26 |
| 3,962,529 A | * | 6/1976 | Kubo | 165/104.21 |
| 3,978,518 A | * | 8/1976 | Kessler et al. | 165/104.26 |
| 4,000,776 A | * | 1/1977 | Kroebig et al. | 165/104.26 |
| 4,090,555 A | * | 5/1978 | Anderson et al. | 165/104.21 |
| 4,274,476 A | * | 6/1981 | Garrett | 165/80.4 |
| 4,315,498 A | * | 2/1982 | Devin et al. | 165/272 |
| 4,789,023 A | * | 12/1988 | Grant | 165/104.26 |
| 4,917,175 A | * | 4/1990 | Sakaya et al. | 165/104.26 |
| 5,426,495 A | * | 6/1995 | Sawamura et al. | 165/89 |
| 6,065,529 A | * | 5/2000 | Antoniuk et al. | 165/104.26 |

FOREIGN PATENT DOCUMENTS

| | | |
|---|---|---|
| JP | A 62-245086 | 10/1987 |
| JP | A 63-151514 | 6/1988 |
| JP | A 64-26887 | 1/1989 |
| JP | U 64-46670 | 3/1989 |
| JP | A 4-124591 | 4/1992 |
| JP | A 10-339592 | 12/1998 |
| JP | A 2005-233603 | 9/2005 |

* cited by examiner

*Primary Examiner*—Ljiljana (Lil) V Ciric
(74) *Attorney, Agent, or Firm*—Oliff & Berridge, PLC

(57) ABSTRACT

An exhaust path and a heated portion such as an air duct of an internal combustion engine are connected to each other by a heat pipe. A heat pipe working fluid (water) vaporized by the heat of the exhaust gas in a heat receiving portion of the heat pipe is condensed in a heat discharging portion of the heat pipe and heated in the heated portion by the heat of the exhaust gas. An outer cylinder is formed around the casing of the heat pipe, and the exhaust path and the heated portion are connected to each other through heat insulating members, while at the same time supporting the heat pipe body through heat insulating members.

1 Claim, 1 Drawing Sheet

HEAT PIPE STRUCTURE

BACKGROUND OF THE INVENTION

Field of the Invention

This invention relates to a heat pipe.

A heat pipe in which heat can be transferred from a high-temperature portion to a low-temperature portion with a high heat transfer rate is known in the art.

The heat pipe, with a working fluid sealed therein operates in such a manner that the working fluid is vaporized at a heat receiving portion disposed in the high-temperature portion (heating portion) and the vaporized working fluid is condensed at a heat discharging portion disposed in the low-temperature portion (heated portion) to thereby transfer heat from the heating portion to the heated portion. The working fluid condensed in the heat discharging portion returns to the heat receiving portion, so that the vaporization/condensation cycle is repeated.

The heat pipe, in which heat is transferred by vaporization and condensation of the working fluid, can achieve a much larger heat transfer rate than a heat transfer by a mere heat conduction in a material.

An example of the heat pipe of this type is described in Japanese Examined Patent Publication (Kokoku) No. 1-26887.

The '887 publication discloses a device using a heat pipe which recovers heat of an automobile engine exhaust gas in order to heat the compartments of the vehicle.

Japanese Unexamined Patent Publication (Kokai) No. 2005-233603, on the other hand, discloses a method for configuring a double walled heat pipe structure with fins on the outer wall in which an outer cylinder having fins is fitted on the outside of the heat pipe. According to the method described in the '603 publication, the working fluid sealed in the heat pipe is vaporized by heating the whole heat pipe, and the heat pipe wall is plastically deformed by the inner pressure so that the outer surface of the heat pipe wall closely contacts the inner surface of the finned outer cylinder thereby to obtain a heat pipe with fins easily.

In the device disclosed in '887 publication, an exhaust path and a compartment air conditioning air duct are connected by a heat pipe so that the air is effectively heated by the heat of the exhaust gas.

The heat pipe system recovering the engine exhaust gas heat as disclosed in the '887 publication, however, may pose a problem.

Usually, water is used as a working fluid for the heat pipe due to its advantage in terms of price and environment protection. The temperature of the engine exhaust gas varies widely from that of a low-load operation mode to that of a high-load operation mode, and at the time of the high-load operation, the temperature of the exhaust gas may become more than 1200° K. As a result, if water is used as a working fluid for the heat pipe, the inner pressure (vapor pressure) of the heat pipe increases excessively at high temperatures, and in some cases, the heat pipe may be damaged due to excessive inner pressure.

To prevent this problem, a thicker heat pipe wall is required in order to increase the strength of the heat pipe. In view of the fact that the heat pipe is often formed of a comparatively expensive nickel alloy in order to increase the hydrogen embrittlement resistance at a high temperature, however, an increased heat pipe wall thickness would increase the production cost of the heat pipe.

Also, the heat pipe has an inherent automatic overheat suppression effect.

Namely, with an excessive increase in exhaust gas temperature, for example, the heat dissipation from the heat discharging portion of the heat pipe increases correspondingly. This may overheat the portion heated by the heat pipe (heated portion). Actually, however, the use of water as a working fluid for the heat pipe vaporizes all of the water within the heat pipe at an increased exhaust gas temperature and makes it impossible for water in liquid form to exist. Therefore, water is neither condensed in the heat discharging portion nor vaporized in the heat receiving portion.

As a result, with the increase in the exhaust gas temperature, the heat transfer function as a heat pipe due to the vaporization/condensation cycle is lost, and the heat transfer rate for the heat pipe as a whole is reduced. Thus, the heat amount dissipated from the heat discharging portion is reduced to thereby automatically suppress the overheating.

A large thickness of the heat pipe wall, however, increases the amount of heat flowing from the high-temperature portion to the low-temperature portion by heat conduction through the pipe wall. Once the pipe wall thickness is increased, therefore, a comparatively large amount of heat is moved from the high-temperature portion to the low-temperature portion through the pipe wall even in the case where all of the water in the heat pipe is vaporized, thereby leading to the problem of insufficient overheat suppression of the heated portion.

In order to solve the above-mentioned problem, the amount of the working fluid such as the water sealed in the heat pipe may be adjusted so that the inner pressure of the heat pipe is kept comparatively low even in the case where all of the working fluid is vaporized at a high exhaust gas temperature. In this case, the thickness of the heat pipe wall may be reduced.

In practical applications, however, the heat pipe wall is required to function as a structural member for connecting the high-temperature portion (heating portion) and the low-temperature portion (heated portion). The thickness of the pipe wall, therefore, is often determined by not only the inner pressure of the heat pipe but also the required structural strength. Therefore, it is sometimes difficult to reduce the heat pipe thickness in order to achieve the required structural strength. This makes it impossible to secure a sufficient overheat suppression effect.

SUMMARY OF THE INVENTION

In view of the problems as set forth above, the object of the present invention is to provide a heat pipe in which a heated portion can be prevented from being overheated without adversely affecting the heat pipe strength.

The object as set forth above is achieved by a heat pipe, according to the present invention, comprising a heat receiving portion and a heat discharging portion whereby the heat inputted to the heat receiving portion from a high-temperature heating portion is discharged to a low-temperature heated portion, characterized in that the heat pipe further comprises a reinforcing member formed independently of the wall of the heat pipe for connecting the heating portion and the heated portion and a heat insulating member for preventing the heat from being transferred from the heating portion to the heat discharging portion by heat conduction through the reinforcing member.

Namely, the heat pipe according to the present invention includes a reinforcing member separate from the heat pipe wall. By providing this reinforcing member, the burden on the heat pipe as a structural member for connecting the heating portion and the heat discharging portion is reduced, and therefore the thickness of the heat pipe wall can be reduced.

Also, the provision of a heat insulating member for preventing the heat from being transferred from the heating portion to the heat discharging portion by heat conduction through the reinforcing member prevents the heated portion from being overheated by the heat transferred through the reinforcing member by heat conduction even at high temperatures.

In the present invention, the heat insulating member preferably prevents not only the heat transfer from the heating portion to the heated portion directly through the reinforcing member but also the heat transfer through the reinforcing member and the heat pipe wall, for example, following the path the heat pipe heat receiving portion—the heat pipe wall—the reinforcing member—the heat pipe wall—the heat discharging portion.

According to the present invention, the reinforcing member may be formed as an outer cylinder covering the outer periphery of the heat pipe wall and connected to the heating portion and the heated portion through the heat insulating member.

Namely, if the reinforcing member is formed as an outer cylinder covering the outer periphery of the heat pipe wall, the heat pipe can be reinforced against the inner pressure by the reinforcing member covering the outer periphery of the heat pipe through the heat insulating member. Therefore, it becomes possible to further reduce the thickness of the heat pipe wall without reducing the heat pipe strength and the heat flow from the heat receiving portion to the heat discharging portion through the heat pipe wall can be remarkably reduced.

In this case, the outer cylinder is formed as a hermetic structure and a pressurized gas (such as inert gas) is sealed between the outer cylinder and the heat pipe wall. The pressure of the sealed gas, which acts as a heat insulating member between the outer cylinder and the heat pipe wall, increases as the temperature becomes higher. Therefore, the increase in the inner pressure of the heat pipe in accordance with the increase in the temperature can be effectively cancelled by the increase in the gas pressure between the outer cylinder and the heat pipe wall.

Thus, according to the present invention, the overheating of the heated portion can be effectively prevented without reducing the structural strength of the heat pipe.

BRIEF DESCRIPTION OF THE DRAWINGS

The present invention will be better understood from the description, as set forth hereinafter, with reference to the accompanying drawing in which.

DESCRIPTION OF THE PREFERRED EMBODIMENT

Figure 1:
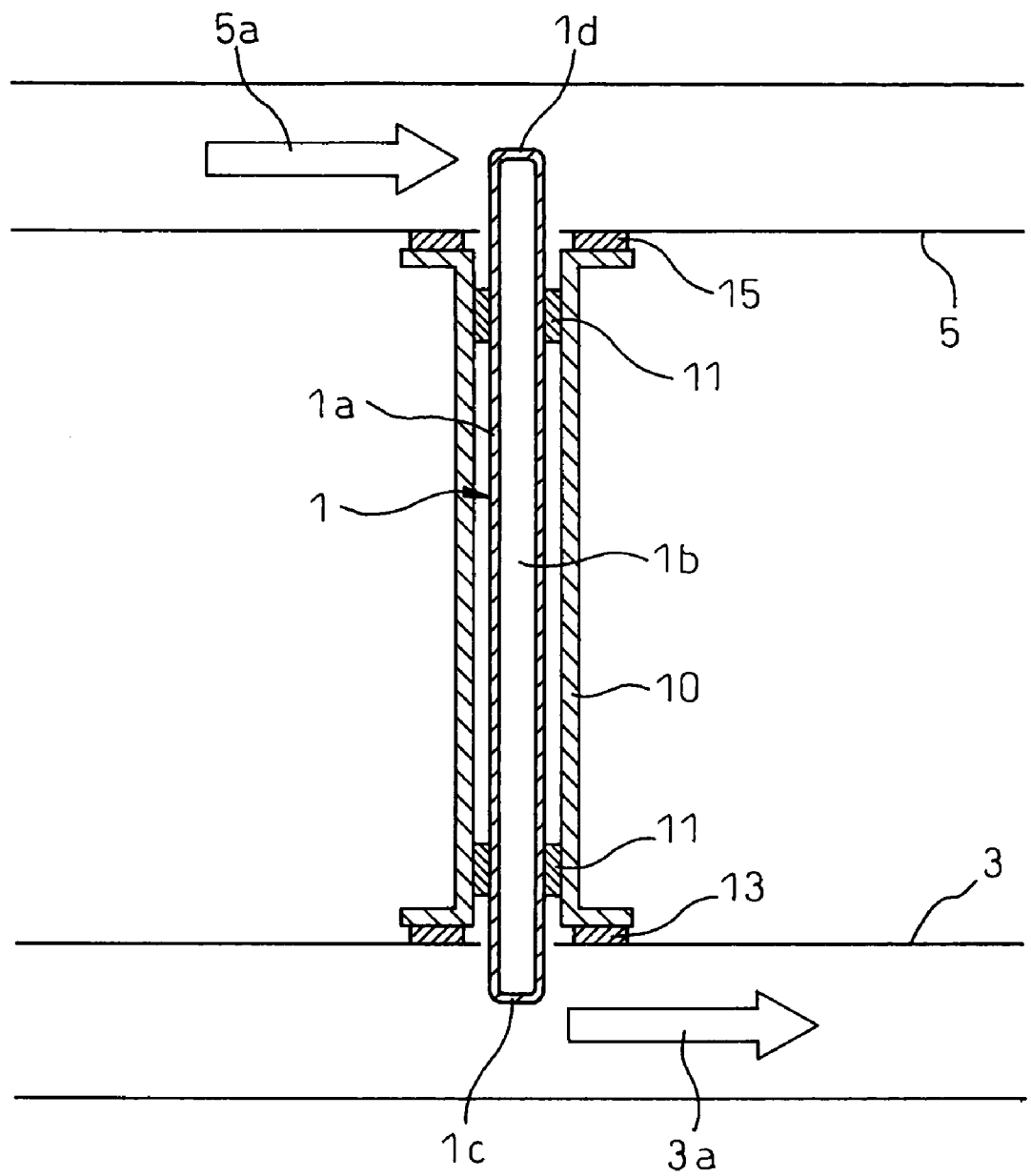
FIG. 1 is a schematic view for explaining a general configuration of an embodiment of the present invention when it is applied to an automobile internal combustion engine.

Hereinafter, an embodiments of the heat pipe according to the present invention will be explained with reference to the accompanying drawing.

FIG. 1 schematically illustrates an embodiment of the present invention when applied to an automobile internal combustion engine.

In FIG. 1, numeral 1 designates the heat pipe as a whole. The heat pipe 1 includes a tubular casing 1a of anticorrosive nickel alloy with the ends closed, and according to this embodiment, water acting as a working fluid for the heat pipe is sealed in the inner space 1b of the casing 1a.

According to this embodiment, the heat pipe 1 has an end portion 1c arranged at a position in contact with a high-temperature exhaust gas 3a in the exhaust path 3 of an automobile internal combustion engine (not shown).

The other end portion 1d of the heat pipe, on the other hand, is arranged at a position in contact with a low-temperature heated medium 5a.

According to this embodiment, air in an air conditioning device passing through an air duct 5 for heating the compartments, for example, is used as the heated medium 5a. As required, however, a fuel oil, a lubricating oil or a similar medium can alternatively be used as the heated medium 5a.

In the case of FIG. 1, the end portion 1c of the heat pipe 1 functions as a heat receiving portion for receiving the heat from the engine exhaust gas and the other end portion id as a heat discharging portion for applying the heat to the heated medium 5a.

Also, the exhaust pipe 3 functions as a heating portion for heating the heat receiving portion 1c of the heat pipe 1, and the duct 5 or the like in which the heated medium 5a flows functions as a heated portion heated by the heat discharging portion.

As explained above, the working fluid (water in this embodiment) is sealed in the cavity 1b of the heat pipe 1.

This water is heated by the high-temperature exhaust gas and vaporized at the heat receiving portion 1c. The vapor generated thereby is condensed into water in liquid form by discharging heat to the heated medium at the low-temperature heat discharging portion 1d. This water is returned to the heat receiving portion 1d under gravity along the pipe wall 1a of the heat pipe 1 and after being evaporated again, repeats the vaporization/condensation cycle. Alternatively, a porous wick structure may be used to return the condensed water to the heat receiving portion 1c of the heat pipe.

The heat transfer between the water and the casing 1a of the heat pipe is by vaporization at the heat receiving portion 1c and by condensation at the heat discharging portion 1d. The heat transfer rate between the water, the vapor and the casing 1a in the heat receiving portion 1c and the heat discharging portion 1d, therefore, is very high as compared with the heat transfer rate of normal heat transfer by contact between water or vapor and a metal, so that a large amount of heat can be transferred from the heating portion 3 to the heated portion 5 by the heat pipe 1.

Nevertheless, a problem may occur in the case where the heat receiving portion 1c of the heat pipe is heated by the exhaust gas of the automobile internal combustion engine as in this embodiment.

As described above, the load on the automobile varies largely with the running condition, and therefore, the engine exhaust gas temperature also changes over a wide range (for example, from a comparatively low temperature of about 400° K. to the temperature as high as about 1100° K.).

With the increase in the exhaust gas temperature, water may be unable to exist in the heat pipe 1 in liquid form and the heat pipe may be filled up with the water in vapor phase. In such a case, the vapor is not condensed in the heat discharging portion 1d, and therefore, the inner pressure of the heat pipe rises with the heat pipe temperature (exhaust gas temperature).

Therefore, in some cases where the amount of water sealed in the heat pipe is relatively large, the inner pressure of the heat pipe at high temperatures increases largely. Thus, in order to prevent the heat pipe from being damaged, the thickness of the casing 1a must be increased in order to increase the pressure resistance of the casing 1a.

In view of the fact that a nickel alloy is normally used for the casing 1a of the heat pipe to prevent the reduction in strength due to hydrogen embrittlement at high temperatures, however, an increased thickness of the casing 1a poses the problem of an increased heat pipe production cost.

Also, an increased thickness of the heat pipe casing 1a leads to another problem in addition to the increased cost.

With the increase in the exhaust gas temperature, as described above, for example, all of the water in the heat pipe 1 may be vaporized and no water in liquid form may come to exist in the heat pipe. Under this condition, water is neither vaporized in the heat receiving portion nor condensed in the heat discharging portion. As a result, since the heat transfer by vaporization/condensation is not possible in this condition, the heat transfer rate between the vapor and the heat pipe wall is largely reduced.

In the case where the temperature of the heat receiving portion of the heat pipe using water increases to such a high level as to vaporize all of the water in the heat pipe, therefore, the heat transfer rate of the heat pipe as a whole is greatly reduced with the result that the heat discharging portion is maintained at a relatively low temperature. In other words, the excessive temperature rise of the heated medium 5a is automatically suppressed.

If the thickness of the casing 1a of the heat pipe is increased as described above, however, the amount of heat transferred by heat conduction from the heating portion to the heated portion through the metal of the pipe wall of the casing 1a also increases. This increase in the heat transfer through the heat pipe wall reduces the effect of the heat discharging portion for suppressing the temperature increase. As a result, an increased thickness of the heat pipe casing 1a poses the problem that the heated portion is easily overheated.

The inner pressure of the heat pipe at high temperatures can be kept low to some degree by reducing the amount of water sealed in the heat pipe, for example. In this way, the thickness of the heat pipe casing 1a can be theoretically reduced.

Actually, however, the heat pipe casing 1a is often required to function as a structural member for connecting the heating portion 3 and the heated portion 5, for example, and the thickness of the casing 1a is required to be sufficiently large in order to maintain the structural strength as well as to endure the inner pressure. The thickness of the casing 1a, therefore, cannot be reduced for the simple reason that the increase in the inner pressure of the heat pipe can be successfully suppressed.

Thus, the heat pipe using a heating medium such as an exhaust gas of the automobile engine which may reach a high temperature, poses the problem that the overheating of the heated portion cannot be completely prevented.

According to this embodiment, the overheating of the heated portion can be suppressed by setting the thickness of the casing 1a at a small value without reducing the structural strength of the heat pipe by the following described method even at high temperatures.

Namely, this embodiment employs a configuration in which, as shown in FIG. 1, an outer cylinder 10 is arranged as a reinforcing member on the outside of the casing 1a of the heat pipe 1.

According to this embodiment, the outer cylinder 10 is fabricated of a material such as a structural carbon steel or stainless steel which is less expensive than a nickel alloy for the heat pipe casing.

Also, according to this embodiment, the outer cylinder 10 covers the whole outer periphery of the casing 1a of the heat pipe 1, and is connected to the casing 1a through heat insulating members 11, to the heating portion 3 such as an exhaust pipe through a heat insulating member 13, and to the heated portion 5 such as a climate control air duct through a heat insulating member 15. In this way, the outer cylinder 10 functions as a structural member for supporting the heating portion 3, the heated portion 5 and the heat pipe 1.

According to this embodiment, the outer cylinder 10 functions a reinforcing member and the required structural strength is provided by the outer cylinder 10. Therefore, the casing 1a of the heat pipe 1 is required to have a strength only sufficient for resisting the inner pressure at high temperature.

The inner pressure of the heat pipe with all the working fluid vaporized at high temperatures can be adjusted by changing the amount of the working fluid sealed in the heat pipe 1. According to this embodiment, therefore, the working fluid is sealed in the minimum required amount to maintain the performance of the heat pipe. Thus, the thickness of the heat pipe casing 1a can be reduced by minimizing the rise of the inner pressure of the heat pipe at high temperatures.

The heat insulating members 11, 13, 15 according to this embodiment are formed of, for example, ceramics fiber or glass fiber. Nevertheless, other heat-resistant heat insulating members can also be used.

According to this embodiment, the provision of the heat insulating members 13, 15 prevents the heat from being transferred directly from the heating portion 3 to the heated portion 5 by heat conduction through the outer cylinder 10 constituting a reinforcing member. Also, in view of the fact that the heat pipe casing 1a is supported by the outer cylinder 10 through the heat insulating members 11, heat is prevented from being transferred to the low-temperature portion of the heat pipe casing 1a through the pipe wall of the outer cylinder 10 from the high-temperature portion of the heat pipe casing 1a. As a result, the heat transferred by heat conduction directly to the heated portion from the heating portion at high temperatures passes only through the heat pipe casing wall. Thus, the thickness of the casing 1a can be reduced while suppressing the overheating of the heated portion at high temperatures.

According to this embodiment, therefore, an inexpensive working fluid having a relatively high vapor pressure, such as water, can be used for the heat pipe operating at high temperatures. Thus, the production cost of the high-temperature heat pipe can be reduced.

Incidentally, the heat amount Q transferred from the heating portion to the heated portion through the casing 1 at high temperatures of the heat pipe can be approximately expressed by the equation below.

$$Q \approx (T_1 - T_2) \times \lambda \times (\pi \times d \times t)/L$$

where $T_1$ is the heating portion temperature, $T_2$ is the heated portion temperature, $\lambda$ is the heat transfer rate of the heat pipe casing, L is the length of the heat pipe casing, d is the diameter of the heat pipe casing, and t is the thickness of the heat pipe casing.

Assuming that $T_1$ is the maximum high temperature that can be reached by the heating portion, $T_1$ is the tolerable maximum temperature of the heated portion and Q is the heat amount absorbed by the heated portion at the tolerable maximum temperature thereof, therefore, the maximum thickness tmax of the heat pipe casing 1a with which the overheating of the heated portion at high temperatures can be prevented can be determined using the following equation as a modification of the aforementioned equation.

$$tmax = Q \times L/((T_1 - T_2) \times \lambda \times \pi \times d)$$

By setting the thickness of the heat pipe casing to tmax calculated by the equation above, the temperature of the heated portion is prevented from increasing beyond $T_2$, and thus the overheating of the heated portion can be positively prevented at high temperatures.

In this case, tmax is required to be not less than the minimum thickness tmin which can resist the inner pressure of the heat pipe at high temperatures. In the case where the outer cylinder 10 acting as a reinforcing member is also given a function of reinforcement against the inner pressure as well as maintaining the structural strength, however, the thickness tmax can be set smaller than the minimum thickness tmin for pressure resistance.

Specifically, in the case of FIG. 1, the heat insulating member 11 is arranged only in the neighborhood of each end of the outer cylinder between the heat pipe casing 1*a* and the outer cylinder 10. By filling up the heat insulating member 11 in the whole space between the heat pipe casing 1*a* and the outer cylinder 10, however, the expansion of the heat pipe casing 1*a* by the inner pressure is suppressed, and the thickness of the casing 1*a* can be reduced without reducing the pressure resistance of the casing 1*a*.

Even in the case where the heat insulating members 11 are arranged partially along the length of the heat pipe casing 1*a* as shown in FIG. 1, on the other hand, the thickness of the casing 1*a* can be reduced without reducing the pressure resistance of the heat pipe casing 1*a* by providing a hermetic seal at each end of the outer cylinder 10 and sealing an inert gas such as nitrogen in the space portion intermediate between the seals defined by the outer cylinder 10 and the heat pipe casing 1*a*.

In this case, the pressure of the inert gas sealed between the outer cylinder 10 and the heat pipe casing 1*a* increases with the temperature of the heat pipe 1. Therefore, the increased tensile stress of the casing 1*a* due to the increased inner pressure of the heat pipe caused by the temperature increase can be offset by the pressure rise of the inert gas sealed between the heat pipe casing 1*a* and the outer cylinder 10. As a result, that portion of the pipe wall of the heat pipe casing 1*a* which is affected by the inert gas pressure can be reduced in thickness without reducing the pressure resistance.

The invention claimed is:

1. A heat pipe comprising:
a heat receiving portion;
a heat discharging portion, whereby heat inputted to the heat receiving portion from a high-temperature heating portion is discharged to a low-temperature heated portion;
a reinforcing member formed independently of the wall of the heat pipe for connecting the heating portion and the heated portion; and
a heat insulating member for preventing the heat from being transferred from the heating portion to the heat discharging portion by heat conduction through the reinforcing member:
wherein the reinforcing member is formed as an outer cylinder covering the outer periphery of the heat pipe wall and connected to the heating portion and the heated portion through the heat insulating member.

* * * * *

UNITED STATES PATENT AND TRADEMARK OFFICE
CERTIFICATE OF CORRECTION

PATENT NO. : 7,621,318 B2  Page 1 of 1
APPLICATION NO. : 11/482720
DATED : November 24, 2009
INVENTOR(S) : Ramesh Gupta et al.

It is certified that error appears in the above-identified patent and that said Letters Patent is hereby corrected as shown below:

Title Page; item (73);
        There is a typographical error in the name of one of the Assignees. The correct spelling of ExxonMobil does not contain a final "e".

Signed and Sealed this

First Day of June, 2010

David J. Kappos
*Director of the United States Patent and Trademark Office*